US008650392B2

(12) United States Patent
Lowekamp

(10) Patent No.: US 8,650,392 B2
(45) Date of Patent: Feb. 11, 2014

(54) TICKET AUTHORIZATION

(75) Inventor: Bruce Bernard Lowekamp, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/784,880

(22) Filed: May 21, 2010

(65) Prior Publication Data

US 2011/0289313 A1 Nov. 24, 2011

(51) Int. Cl.
*H04L 29/06* (2006.01)
(52) U.S. Cl.
USPC ............................. 713/155; 713/156; 726/10
(58) Field of Classification Search
USPC .................... 726/10; 713/155, 156
See application file for complete search history.

(56) References Cited

U.S. PATENT DOCUMENTS

| 7,243,370 | B2 * | 7/2007 | Bobde et al. ............. 726/10 |
| 2007/0061271 | A1 * | 3/2007 | Ala-Luukko ............ 705/64 |
| 2009/0158394 | A1 * | 6/2009 | Oh et al. ................. 726/3 |
| 2010/0223472 | A1 * | 9/2010 | Alvarsson ................ 713/176 |

FOREIGN PATENT DOCUMENTS

WO  WO-2011144709  11/2011

OTHER PUBLICATIONS

Shansi et al. (2006). ASAP: an AS-aware peer-relay protocol for high quality VoIP. In Distributed Computing Systems, 2006. ICDCS 2006. 26th IEEE International Conference on (pp. 70-70). IEEE.*
Beyong-Thaek Oh,, el al."A Peer Mutual Authentication Method Using PKI on Super Peer Based Peer-to-Peer Systems," Advanced Communication Technology, pp. 2221-2225 (2008).
Notification of Transmittal of the International Search Report and The Written Opinion of the International Searching Authority, or the Declaration for PCT/EP2011/058193, Date of Mailing: Sep. 19, 2011, 9 pp.

* cited by examiner

*Primary Examiner* — Kambiz Zand
*Assistant Examiner* — Ali Shayanfar
(74) *Attorney, Agent, or Firm* — Sonia Cooper; Jim Ross; Micky Minhas

(57) ABSTRACT

A method for issuing tickets in a communication system comprising a plurality of nodes that are capable of establishing a communication connection between two or more clients, the method comprising a first client transmitting to a ticket-issuing service a request for a ticket authorizing the first client to establish a communication connection with a second client, the ticket-issuing service determining if the first client is authorized to establish the requested communication connection and if the first client is determined to be authorized to establish the requested communication connection, the ticket-issuing service transmitting to the first client one or more tickets designating the second client which authorizes the first client to establish the requested connection with the second client by means of one or more of the plurality of nodes.

36 Claims, 4 Drawing Sheets

TICKET AUTHORIZATION

TECHNICAL FIELD

The invention relates to a method for authentication and authorization in a communication system.

BACKGROUND

Communication systems link together two communication devices so that the devices can send information to each other in a call or other communication event. Information may include voice, text, images or video.

Many communications systems are essentially operated by centralized servers that are provided by the communication system provider. A user may obtain services from the communication system by accessing one of these servers. Before providing the user with any services of the communications system, the servers may perform an authentication process to identify the user and then check that the user is authorized to use the requested services.

One possible authentication and authorization process is provided by the Kerberos protocol, which is a network protocol for enabling nodes communicating over a non-secure network to prove their identity to one another in a secure manner. The Kerberos protocol makes use of a trusted third party, known as a key distribution centre (KDC), to issue "tickets" that prove the identity of a user. An example is shown in FIG. 1.

FIG. 1 illustrates a communication system shown generally at 101 that comprises a client 102, a service server (SS) 103 and a KDC 104. The KDC comprises two logically separate parts: an authentication server (AS) 105 and a ticket granting server (TGS) 106. The KDC also comprises a database 107. When client 102 wants to access a service via SS 103 it first authenticates itself to AS 105. The client authenticates itself by sending the AS its user identity and a secret key it has created by hashing its password. The AS first checks whether the client is known to it by checking the database for the client's user identity and password. Although the client does not transmit its password as part of its request message, the AS is able to nonetheless check the password by performing the same hashing function on the password stored in the database to replicate the client's secret key, which was transmitted as part of the request message. If the AS authenticates the client successfully, it returns a "ticket-granting ticket" to the client, which the client can use to obtain a "service-granting ticket" from TGS 106. The client can then pass the "service-granting ticket" to the SS 103 to obtain the required service. All tickets are time-stamped and may be valid only for a limited period of time.

Each authenticating stage of the Kerberos protocol includes two parts: a message that contains a key encrypted in such a way that it can be decrypted only by the party that the ticket is intended to authenticate; and a ticket that also contains the key but which is encrypted in such a way that it can only be decrypted by the party that is intended to perform the authentication. As an example, the AS sends two messages to an authorized client. The first message is a client/TGS session key. It is encrypted with the client's secret key so that only the client can decrypt it. The second message includes the "ticket-granting ticket". This also includes the client/TGS session key, but the ticket has been encrypted using the secret key of the TGS so that only the TGS can decrypt this part of the message. When the client wants to request a "service-granting ticket" from the TGS, it forwards the "ticket-granting ticket" to the TGS together with an authenticator including the client's user id and a timestamp that has been encrypted using the client/TGS session key. The TGS cannot decrypt the authenticator immediately, because it does not have the client/TGS session key. However, the TGS can decrypt the "ticket-granting ticket" (since that was encrypted using its secret key). By decrypting the "ticket-granting ticket", the TGS obtains the client/TGS session key, which it can then use to decrypt the authenticator.

The process is very similar for the "service-granting ticket" issued by the TGS. At each stage, a session key for authenticating a client is sent in encrypted form so that it can only be decrypted by the intended recipient of the message. This ensures that the session key is not intercepted and used by a rogue third party. The session key itself is also used to encrypt part of the message, so that the recipient knows that the party that generated the message was in possession of the session key and is thus entitled to access the requested services.

The Kerberos protocol therefore involves the issuance of tickets to authenticate a user and grant access to a particular service. As an example, the user may request a ticket from the ticket granting server to access an email system. A ticket is then granted that the user gives to the mail server that:

1. Identifies the user (authentication); and
2. Authorizes the user to utilize the service.

Some communication systems do not rely on centralized servers. One such system is a peer-to-peer communication system, in which a plurality of end users can be connected for communication purposes via a communications structure such as the internet. The communication structure of a peer-to-peer system may be formed by a large number of distributed nodes. The distributed nodes may not necessarily be owned or operated by the communications system provider. Instead, the nodes may also be clients running software that programs them to behave both as a client utilizing the system and as a node providing the communications system. The communication structure can thus be created by essentially "borrowing" a small amount of computing resources from millions of devices. A user can then access the peer-to-peer system via any one of those devices. In such systems, it is no longer necessary for the user to access a centralized server in order to gain access to the communications system as a whole.

The Kerberos authentication mechanism has also been implemented in a peer-to-peer communication system (see e.g. "A Peer Mutual Authentication Method using PKI on Super Peer based Peer-to-Peer Systems" by Oh et al). This mechanism uses peers to authenticate other peers, rather than the AS, which reduces the load of ticket authentication on the AS. In the first stage of authentication, a peer A requests authentication from the AS via a super peer. The request includes a digital signature formed by encrypting the user ID and time stamp with the user's private key. The AS creates a session key that only peer A will be able to decrypt and sends it to the super peer. The super peer then sends a connection granted message including the session key to peer A.

In the second stage of authentication, peer A wants to establish a direct connection with peer B. A virtual communication channel is first established between peer A and peer B. Peer B may then request a ticket for the communication from peer A. Peer A then sends a ticket request message to the super peer and the super peer forwards the request to the AS. The AS creates a ticket encrypted with the session key of peer B and also the session key of peer A. This ticket is sent back to the super peer, which forwards it to peer A. Peer A then decrypts the ticket using its session key and sends the decrypted ticket to peer B over the virtual connection. Peer B decrypts the ticket and checks whether the user ID of peer A is on its user permission list. If so, peer B creates a new ticket having a long lifetime and sends it to peer A. Peer A can then use that ticket to access the service of peer B for the duration of the ticket.

The Kerberos protocol, whether implemented in a centralized server system or a peer-to-peer system, is limited in that it only authorizes access to a service of an end-system. In other words, the tickets authorize a client to access the services of a server, without reference to what the client may use that service for, to the location of the server providing the service, or to what path the client may use to access the service. The clients of many peer-to-peer systems have limited resources available and the super-nodes face high demand by forming the overlay for network traffic. It is therefore useful to be able to prevent attacks that demand clients and/or super nodes service undesirable connections. Such attacks include, for example, the sending of spam. Spammers can exploit open relays that forward email from any client to any destination. In general, spamming through an open relay is lucrative for spammers, as the final recipient sees only the mail relay as the spamming source (see "Botnet Spam Campaigns can be Long-Lasting: Evidence, Implications, and Analysis" by Pathak et al).

"A Peer Mutual Authentication Method using PKI on Super Peer based Peer-to-Peer Systems" does describe a peer issuing a ticket that authorizes another peer to connect to it. This ticket does not authorize the peers to use one of the super peers because it assumes that the peers establish a direct connection between them. This is not a realistic model of connectivity within a super-peer based peer-to-peer system, which achieve connectivity by using the super-peers to relay the connections (at least initial setup) rather than establish a direct connection between clients from the start.

SUMMARY

There is therefore a need for an improved mechanism for issuing tickets in a communication system.

According to one embodiment of the invention, there is provided a method for issuing tickets in a communication system comprising a plurality of nodes that are capable of establishing a communication connection between two or more clients, the method comprising: a first client transmitting to a ticket-issuing service a request for a ticket authorizing the first client to establish a communication connection with a second client; the ticket-issuing service determining if the first client is authorized to establish the requested communication connection; and if the first client is determined to be authorized to establish the requested communication connection, the ticket-issuing service transmitting to the first client one or more tickets designating the second client which authorize the first client to establish the requested connection with the second client by means of one or more of the plurality of nodes.

The method may further comprise the first client including a user identity corresponding to the second client in the request for a ticket and the ticket-issuing service determining the identities of one or more client terminals associated with that user identity.

The ticket-issuing service may transmit to the first client a ticket that designates all of the one or more client terminals associated with the user identity.

The ticket-issuing service may transmit to the first client a plurality of tickets, each of said tickets designating a respective one of the one or more client terminals associated with the user identity.

The communication system may be arranged such that each client terminal operating in the system is allocated one or more nodes by means of which the client terminal may establish a communication connection, the method further comprising the ticket-issuing service determining the identity of the one or more nodes allocated to the client terminal(s) associated with the user identity.

The ticket-issuing service may transmit to the first client terminal a ticket which authorizes the first client to establish the requested connection with the second terminal by means of any of the nodes allocated to the client terminal(s) associated with the user identity.

The ticket-issuing service may transmit to the first client terminal a ticket which authorizes the first client to establish the requested connection with the second client by means of only a subset of the nodes allocated to the client terminal(s) associated with the user identity.

The communication system may be arranged such that each client terminal operating in the system is allocated one or more nodes by means of which the client terminal may establish a communication connection, the method further comprising the first client requesting from the ticket-issuing service a ticket authorizing it to establish a communication connection by means of one or more of the nodes allocated to a client terminal associated with the first client.

The method may further comprise the first client transmitting the ticket to one of the plurality of nodes as part of a request for that node to establish a communication connection between the first client and a second client, said one of the plurality of nodes determining if the ticket authorizes the first client to establish a communication connection by means of that node and said one of the plurality of nodes accepting the request to establish a communication connection if the ticket authorizes the first client to establish a communication connection by means of that node.

The method may further comprise one of the plurality of terminals receiving a request including a ticket from the first client requesting a communication connection with the second client, said one the plurality of terminals determining if the ticket designates the second client and if the ticket is determined to designate the second client, said one of the plurality of nodes establishing a communication connection between the first client and the second client.

The method may further comprise the first client including with the request for a ticket transmitted to the ticket-issuing service a user identity and/or password associated with the first client and the ticket-issuing service determining if the first client is authorized to establish the requested communication connection in dependence on that user identity and/or password.

The ticket-issuing service may determine if the first client is authorized to establish the requested communication connection in dependence on whether the first client is permitted to establish a communication connection with the second client. The ticket-issuing service may determine if the first client is authorized to establish the requested communication connection in dependence on whether the second client is permitted to establish a communication connection with the first client.

The ticket-issuing service may check a prepaid balance associated with the first client and determine that the first client terminal is authorized to establish the requested communication connection in dependence on the prepaid balance. The ticket-issuing service may decrement the pre-paid balance by an amount associated with the requested communication connection before transmitting the ticket to the first client.

The ticket-issuing service may determine if the first client is authorized to establish the requested communication connection in dependence on previous communication connections established by the first client.

The ticket-issuing service may generate the ticket. The ticket-issuing service may generate the ticket in such a way that the ticket can be read by any of the plurality of nodes. The ticket-issuing service may generate the ticket in such a way that the ticket can only be read by one of the one or more of the plurality of nodes that the ticket authorizes the first client to use to establish the requested communication connection.

The ticket-issuing service may encrypt the ticket using a private key associated with the one or more nodes that the ticket authorizes the first client to use to establish the requested communication connection.

According to a second embodiment of the invention, there is provided a node for issuing tickets in a communication system comprising a plurality of nodes that are capable of establishing a communication connection between two or more clients, the node being arranged to: receive a request from a first client for a ticket authorizing the first client to establish a communication connection with a second client; determine if the first client is authorized to establish the requested communication connection; and if the first client is determined to be authorized to establish the requested communication connection, transmit to the first client one or more tickets designating the second client which authorize the first client to establish the requested connection with the second client by means of one or more of the plurality of nodes.

The node may be arranged to identify a user identity corresponding to the second client in the request for a ticket and to determine the identity of a plurality of client terminals in the communication system that are associated with that user identity.

The node may be arranged to transmit to the first client a ticket that designates all of the plurality of client terminals associated with the user identity.

The node may be arranged to transmit to the first client a plurality of tickets, each of said tickets designating a respective one of the plurality of client terminals associated with the user identity.

The communication system may be arranged such that each client terminal operating in the system is allocated one or more nodes by means of which the client terminal may establish a communication connection, the node being arranged to determine the identity of the one or more nodes allocated to the client terminal(s) associated with the user identity.

The communication system may be arranged such that some or all of the nodes allocated to the client terminal for the purpose of establishing a communication connection may also themselves be client terminals comprised in the communication system.

The node may be arranged to transmit to the first client a ticket which authorizes the first client terminal to establish the requested connection with the client terminal by means of any of the nodes allocated to the client terminal(s) associated with the user identity.

The node may be arranged to transmit to the first client a ticket which authorizes the first client terminal to establish the requested connection with the client terminal by means of only a subset of the nodes allocated to the client terminal(s) associated with the user identity.

The node may be arranged to determine from a user identity and/or password included with the request for a ticket that the first client is authorized to establish the requested communication connection.

The node may be arranged to determine if the first client is authorized to establish the requested communication connection in dependence on whether the first client is permitted to establish a communication connection with the second client.

The node may be arranged to determine if the first client is authorized to establish the requested communication connection in dependence on whether the second client is permitted to establish a communication connection with the first client.

The node may be arranged to check a prepaid balance associated with the first client and to determine that the first client is authorized to establish the requested communication connection in dependence on the prepaid balance. The node may be arranged to decrement the pre-paid balance by an amount associated with the requested communication connection before transmitting the ticket to the first client.

The node may be arranged to determine if the first client is authorized to establish the requested communication connection in dependence on previous communication connections established by the first client.

The node may be arranged to generate the ticket. The node may be arranged to generate the ticket in such a way that the ticket can be read by any of the plurality of nodes. The node may be arranged to generate the ticket in such a way that the ticket can only be read by one of the one or more of the plurality of nodes that the ticket authorizes the first client to use to establish the requested communication connection.

The node may be arranged to encrypt the ticket using a private key associated with the one or more nodes that the ticket authorizes the first client to use to establish the requested communication connection.

According to a third embodiment of the invention, there is provided a computer-readable medium encoded with instructions that, when executed by a node capable of issuing tickets in a communication system comprising a plurality of nodes that are capable of establishing a communication connection between two or more clients, cause the node to: receive a request from a first client for a ticket authorizing the first client to establish a communication connection with a second client; determine if the first client is authorized to establish the requested communication connection; and if the first client is determined to be authorized to establish the requested communication connection, transmit to the first client one or more tickets designating the second client which authorize the first client to establish the requested connection with the second client by means of one or more of the plurality of nodes.

BRIEF DESCRIPTION OF THE DRAWINGS

For a better understanding of the present invention, reference is made by way of example to the following drawings, in which.

DETAILED DESCRIPTION

Figure 1:
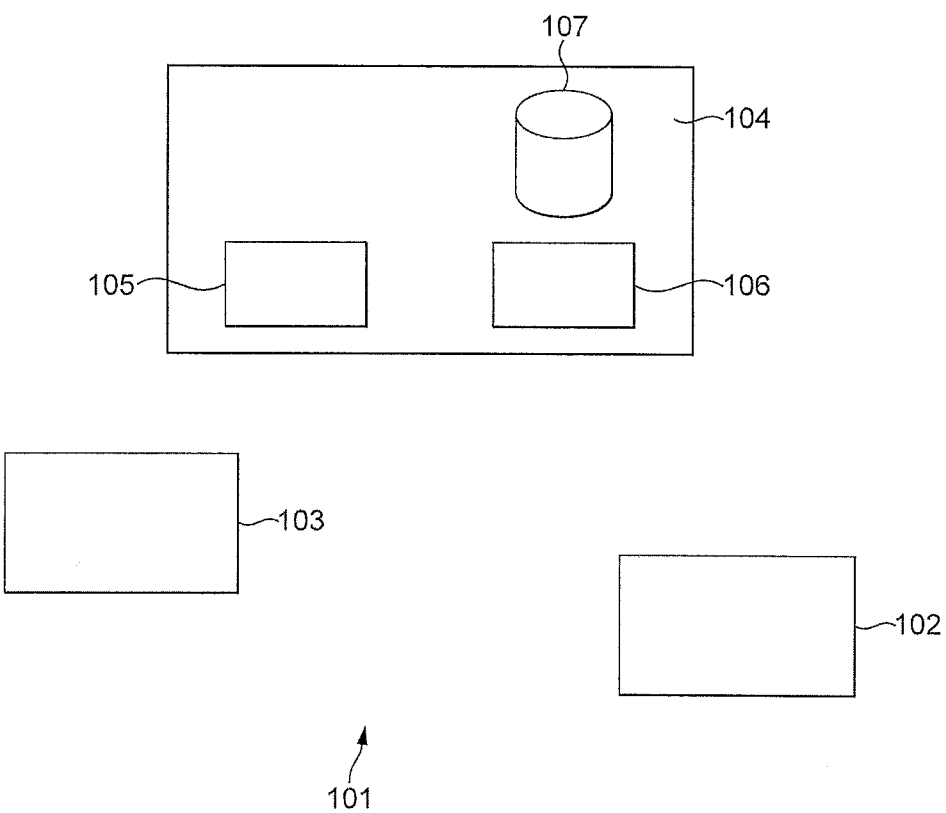
FIG. 1 shows an example of a centralized-server based communication system.

A communication system may comprise a plurality of nodes that are capable of establishing a communication connection between two or more clients. The communication system may require that clients are in possession of a ticket authorizing them to use one or more nodes of the communication system to establish a communication connection. One or more of the nodes in the communication system may provide a ticket-issuing service that is arranged to issue such tickets.

The clients may be any end-points of a connection. For example, the clients might be servers. The clients might also be client terminals, i.e. machines within the communication system. Many communication systems operate not on the basis of identifying and authenticating actual machines within the system but of identifying and authenticating user accounts registered with the communications system provider. Therefore, the "client" might also correspond to a user account rather than a specific machine. Another example of a "client" might be an instance of client software running under a particular user account. Typically such software would be provided by the system provider and would program the user's machine to operate as a node in the communication system. The software might program the user machine so that it operates as a relay within the communication system.

According to one method for issuing tickets, a client that wants to establish a communication connection with another client may transmit a request for a ticket to the ticket-issuing service. The client may request a ticket that authorizes it to establish a communication connection with the other client. The ticket-issuing node may determine whether or not the first client is authorized to establish the requested communication connection. If the first client is authorized to establish the connection, the ticket-issuing service transmits a ticket to the first client terminal. The ticket may designate the client that the requesting client is attempting to contact and may authorize the requested connection. The ticket may further authorize the requesting client to use one or more nodes of the communication system to establish the connection.

A ticket is acquired by the entity initiating the request prior to beginning the actual transaction. During the setup of the communication connection no further communication may be required between the ticket-granting entity and entities that may be involved in establishing the requested connection since the ticket itself provides those entities with sufficient evidence that the connection has been authorized.

This system extends the concept of authorization so that a ticket authorizes a client to establish a future connection via a particular network node, but only if a particular remote node forms the end-point of that connection. Existing authorization mechanisms only authorize access to a service provided by an endpoint node and do not specifically authorize the use of a specific endpoint to provide the service or the use of the relay nodes required to reach the connection end-point. However, many peer-to-peer systems have limited resources available and the nodes that form the overlay for communicating network traffic are in high demand. Therefore, preventing attacks that demand the network nodes service undesirable connections is very useful. These problems may be addressed by requiring a client to obtain authorization before using the network nodes, thereby allowing the system to control the use of its forwarding nodes, and by requiring tickets to designate the end-point of connections so that undesirable connections can be prevented.

The method for issuing tickets described herein may be usefully applied to any type of connection: voice calls, video calls, multimedia connections etc. The method is particularly useful for connections that require a node in the network to forward communications between two clients. The network nodes that perform this forwarding function are often known as relays. The following description therefore refers specifically to relays, although this should not be taken as only an example of the type of node that might accept authorization via a ticket.

Figure 2:
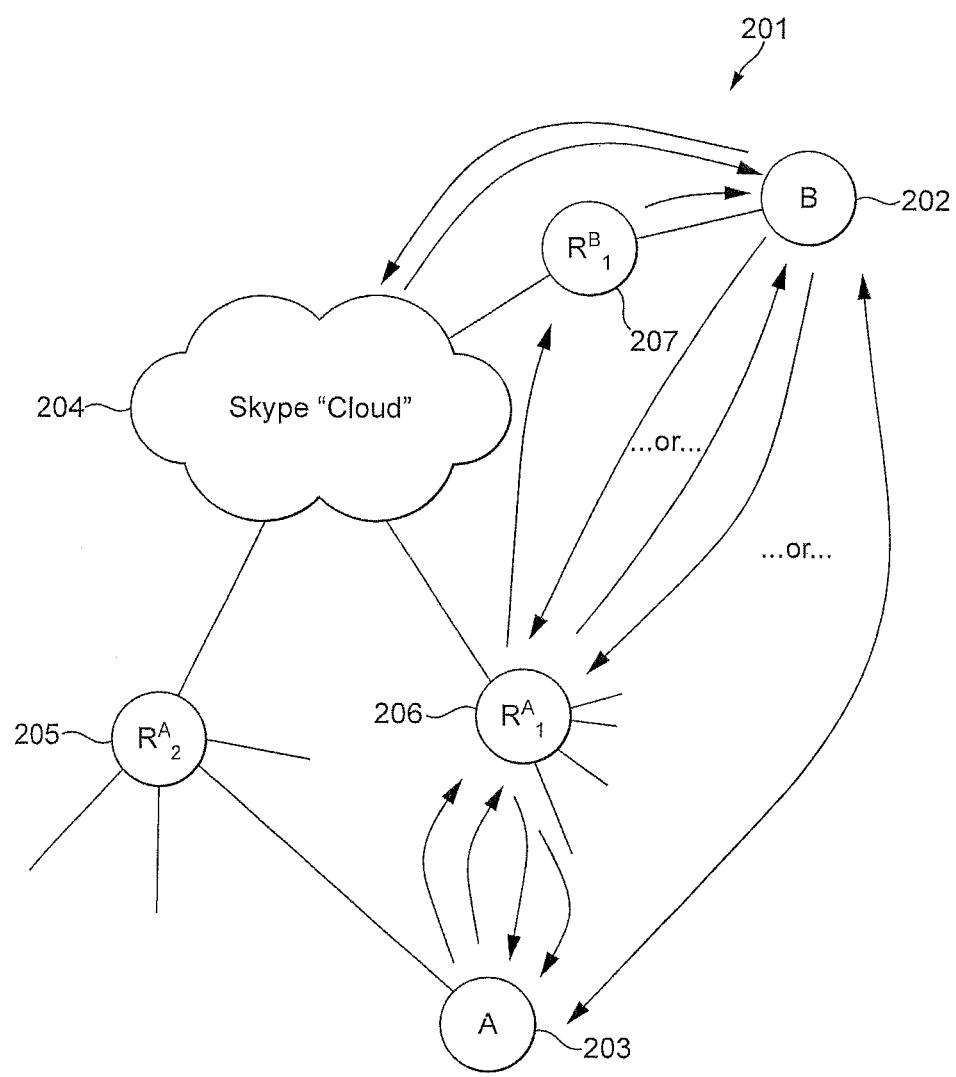
FIG. 2 shows an example of a peer-to-peer system.

FIG. 2 illustrates an example of a communication system in which tickets might be used. The communication system is shown generally at 201. The communication system comprises two client terminals: A and B (203 and 202 respectively). In this example, the communication system is a peer-to-peer system and A and B are clients of that system. Also shown is the "cloud" itself, representing the services that are available to clients of the network through other components of the peer-to-peer overlay. The overlay may incorporate client terminals that are programmed by specific software to operate as nodes of the communication system and servers provisioned by the overlay owner (e.g. the communications system provider). FIG. 2 shows three nodes 205 to 207. These nodes are relay peers (and may also be "super-nodes" in some networks). In this example, each client is associated with at least one relay. The nodes denoted $R^A$ and $R^B$ are relays associated with clients A and B respectively. In FIG. 2, client A is allocated two relays: a primary relay $R^A_1$ (206) and a redundant relay $R^A_2$ (205) which acts as a back-up relay in case the primary relay fails. Client B is shown as being allocated only one relay but any client may be allocated both a primary relay and one or more redundant relays. The arrows in FIG. 2 illustrate different routes by which a communication connection may be established between clients A and B.

As part of the cloud service, there is an authentication service known as the ticket getting service (TGS). This service may be implemented by a single server, a cluster of servers and/or by a selection of peers in the cloud, which may include any or all of the super-nodes/relay peers.

In one embodiment, opening a connection between clients is handled exclusively through the relays. The initial signaling through relays may be followed by a direct connection being established between the two clients so that further communication can pass directly between the clients. Alternatively, the relays may remain on the path for actively routing communication between the clients. In a further embodiment, a client may obtain the address of the client it wishes to contact and may contact that client directly. This is not a preferred embodiment as under certain conditions it may make it easier to bypass the security mechanisms inherent in the protocol.

Figure 3:
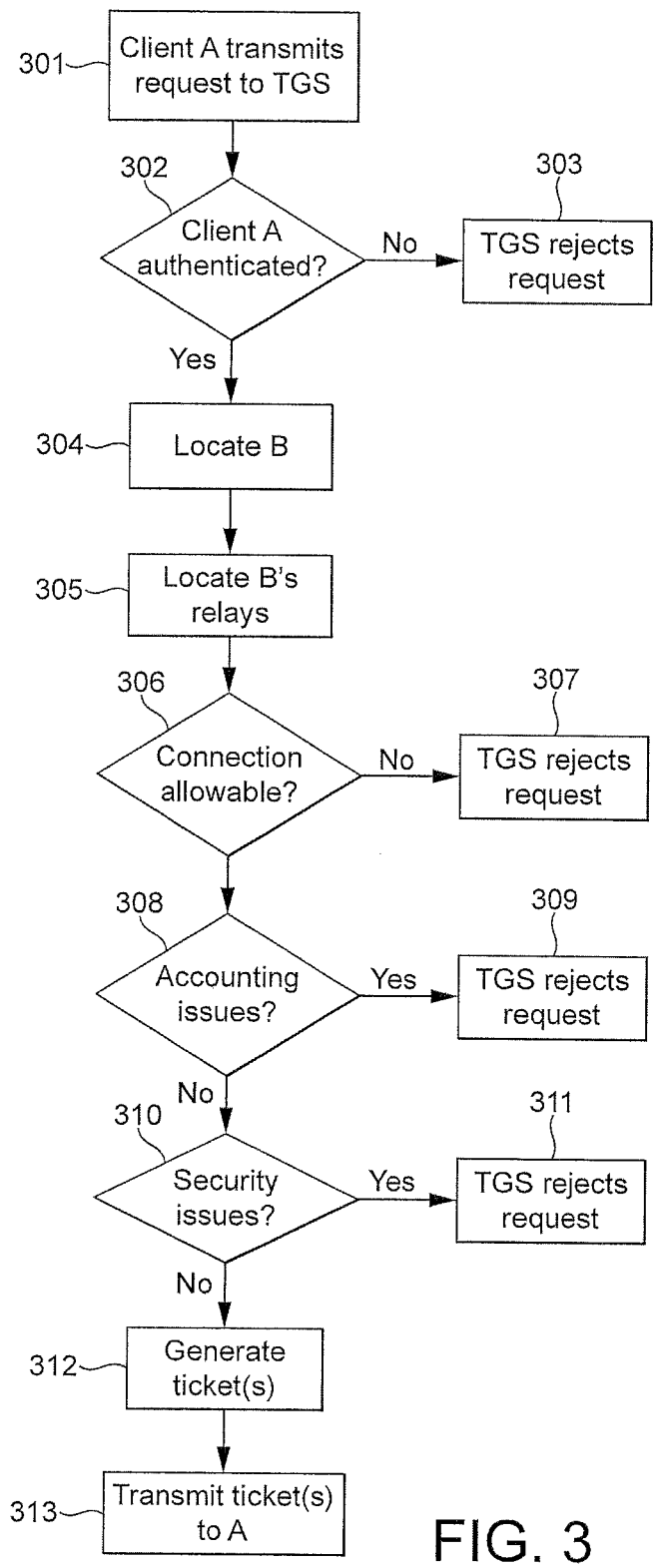
FIG. 3 shows an sequence of steps that may be used to issue a ticket.

FIG. 3 illustrates an example of the steps that may be performed as client A tries to establish a communication connection with client B.

Step 301

Making the request: Client A first makes a request to the TGS asking for a ticket approving the connection with B. Client A may include in this request a user id and/or password. The user id may be associated with a user, a specific machine or both. In some embodiments, rather than including its password as part of the request, client A may include in the request an authenticator generated by applying a function to its password. The client also may include in the request the identity of the client terminal with which the connection is to be established. In some communication systems, the identity of the other party to the connection will strictly speaking be the identity of a user, rather than a terminal, as the same user may access the system using the same user identity but different machines. In such systems, the client A may include the identity of the user it is trying to contact in its request to the TGS.

Step 302

Receiving the request: The TGS receives the request and authenticates the identity of the node A and/or the user of A. This authentication may involve the TGS checking a user identity and/or password the client A included in the request by confirming that these are the same as a user identity and/or password stored in a database to which the TGS has access. Alternatively, if client A did not transmit its password, the TGS may perform the same function on the password stored in its database as the client used in forming the authenticator. If the result of this function is the same as the authenticator then the TGS can deduce that client A is in possession of the correct password.

If the TGS fails to authenticate client A, then it will refuse client A's request for a ticket in step 303. However, if client A is authenticated, the TGS will proceed to step 304.

Step 304

Locating client B: The TGS may perform a search to identify clients corresponding to a user identity included in the request. Such a query may return multiple results if a user corresponding to "client 13" is logged into the system in multiple locations. The TGS may generate a ticket that authorizes communication with only one instance of client B or it may generate a single ticket that is valid for all instances of client B.

Step 305

Locating client B's relays: The TGS may locate the supernode/relay peers through which client B may be contacted. This will include at least one primary relay peer and may also include redundant relay peers. Optionally, the identities of additional nodes that may be used to reach the relays in case the relays themselves cannot be reached may be provided. In a preferred implementation, the location information may be IP address-based, which will allow direct communication between client A and client B's relays or between client A's relays and client B's relays (in the event that client A does not have sufficient outgoing connectivity itself). In some communication systems, the relays are identified via a particular position in the overlay rather than via IP addresses. An example of such a communication system is the overlay network known as Chord, in which the nodes are arranged in a "ring" and are identified via their position in the ring rather than by an IP address. In such communication systems, the location of the relays allocated to client B may be given via overlay-based routing rather than IP addresses.

In a preferred implementation, a ticket that authorizes client A to establish a communication connection with client B will implicitly authorize A to use client B's allocated relays. The relays will therefore recognize that the ticket authorizing client A to contact client B is sufficient to authorize communication through $R^B$. However, additional tickets may be issued that authorize client A to use the relays. In one embodiment, a separate ticket may be required for each $R^B$. If additional nodes are allocated for contacting the relays (e.g. as back-ups in case the relays prove to be unreachable), client A may require additional tickets to use those nodes.

Step 306

Verifying that requested communication connection is allowable: The TGS may check that client A is authorized to contact client B. The TGS may also authorize that client B is authorized to receive the contact. This authorization may include service specific authorization, such as requiring certain account settings to place/receive video calls rather than just voice calls. This authorization may be dependent on a particular type of service requested by client A, a type of connection to be established, the type of data that will be communicated over the requested connection etc.

If the request is not verified, it will be rejected (step 307). Otherwise, the process proceeds to step 308.

Step 308

Accounting: The TGS may perform any accounting associated with the requested connection. This may include verifying funds by checking that a prepaid balance associated with client A and/or client B is sufficient to cover the cost of the requested connection. The TGS might also debit the cost of the requested connection from any pre-paid balance before releasing the ticket. For clients that pay by subscription and/or receive a bill for services used, the TGS may check that the client's account is in good standing, i.e. that all bills have been paid.

If the accounting performed by the TGS indicates that there is a problem with the account associated with one or more of the clients that will be a party to the requested connection, the TGS may refuse the request for the ticket in step 309.

Step 310

Checking the previous calling pattern of client A: The TGS may review previous calling patterns of client A to detect whether A has in the past been engaged in the sending of spam. If so, the TGS will refuse to issue client A with the requested ticket (step 311).

Step 312

Generating the ticket: If the TGS finally determines that client A is authorized to establish the requested connection with client B it will generate a ticket authorizing this connection. The ticket will be designated as authorizing client A to contact client B, so that rather than just authorizing client A to establish a connection via a node of the communication system the scope of the authorization is limited to the specific end-points of the connection. The ticket may designate client B in a wide variety of different ways. For example, the ticket may include a user identity associated with client B, the IP address of a machine associated with client B or the location within the overlay of a machine associated with client B. Alternatively, the ticket may include a different form of identifier that designates client B. For example, the identifier may be an identifier that can only be recognized by the node for whom the ticket is intended.

As explained above, the generated ticket may be valid for all instances of client B, in which case the ticket may include e.g. the locations of all machines in the network associated with client B. Alternatively, the ticket may be valid for only one instance of B, in which case the ticket may include e.g. the location of only one machine in the network associated with client B.

The ticket may also be valid for all of the relays or other nodes allocated to client B, or to only a subset of those relays. The relays or other nodes for which the ticket is valid may be identified in the ticket (e.g. by their IP address or location within the overlay). Alternatively, there may be some other quality of the ticket that is capable of informing the relays or nodes for which the ticket is valid that it is intended for them. For example, all or part of the ticket may be encrypted with the relay or node's private key (see below).

In a preferred embodiment, the tickets issued are clearly marked as authorizing client A to contact client B. These tickets may be read and understood by any machine within the communication system. In an alternative embodiment, the ticket is only readable by its intended target. This may be achieved by the TGS encrypting the ticket in such a way that it can only be read by the intended target, which is suitably a node of the communication system (which could be e.g. client B or one of its allocated relays).

For example, the TGS may encrypt the ticket using the private key of a relay allocated to client. B. This embodiment will typically be most useful when the ticket is intended to authorize client A to establish its connection with client B via only one of client B's allocated relays.

Step 313

Transmitting the ticket to client A: The TGS transmits the generated to ticket to client A so that A can use the ticket in establishing a connection with client B. The steps performed by the TGS may also be performed in a different order from that described above.

The TGS may include with the ticket information informing client A which relays or other nodes it may use to contact client B. This information may be available to client A from the ticket itself, if that ticket is readable by client A.

Once it has received the ticket from the TGS, client A may attempt to establish a communication connection with client B by sending a request to one of the relays allocated to client B. In some circumstances, client A may need to relay that request via one of its own relays. Typically relays allocated to client A will be willing to act on its behalf without additional authorization. However, in some implementations, client A's relays may themselves require tickets before forwarding connection requests on client A's behalf. The TGS may incorporate an authorization that will be acceptable to client A's relays in the same ticket that authorizes the use of client B's relays. Alternatively, the TGS may issue a separate ticket for client A's relays. However, even if client A's relays require a separate ticket, this ticket preferably still designates client B. Client A's relays may require a different ticket for each client that client A wishes to connect with.

When the relay allocated to client B receives the request, it may check that the ticket is valid. For example, it may check that the ticket applies to it and that it is valid for the type of connection being asked for. The relay may also check that the client designated in the ticket matches the client with which the connection has been requested. If everything is in order, the relay may forward the request for a connection to client B, together with the ticket. Client B will also check that the ticket is valid, in a similar way to its relay. If all is in order, client B may accept the connection.

The process of issuing tickets described above may be advantageous because it incorporates concepts of complex authorization, security screening and call tracking into the ticket acquiring process. Because the ticket is required prior to connection, the node that grants the tickets can enforce connection policy and accounting requirements by denying the request, thereby preventing client A and client B from communicating with each other entirely. Similarly, issuing the ticket prior to the connection can assist with call tracking. The ticket granting entity may also perform security screening such as looking for harassment or illegal calling patterns, including being able to detect spam, spina and spit.

Both the clients and the nodes within the system may be implemented in hardware or software; although preferably they are implemented by means of software (e.g. program instructions running on a microprocessor).

As explained above, the TGS may be implemented by a single server, a cluster of servers and/or by a selection of peers in the cloud, which may include any or all of the relays. An example of the functional blocks that might work together to form a TGS is shown in FIG. 4.

Figure 4:
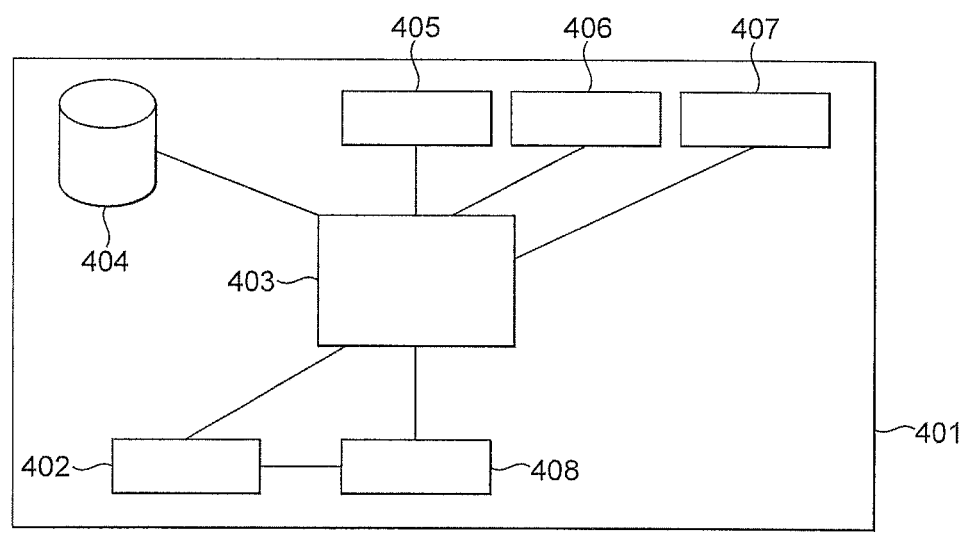
FIG. 4 shows an example of a node capable of issuing tickets.

FIG. 4 shows a TGS generally at 401. The TGS comprises a communication unit 402 for receiving ticket requests from clients in the network. The TGS also comprises an authorization unit 403 for generally authenticating the user and determining whether or not the ticket should be issued. The authorization unit may have access to a database 404 for confirming a user identity and/or password. The authorization unit may also have access to a location unit 405 for identifying instances of client B and for identifying relays and additional nodes allocated to client B. The authorization unit may have access to an accounting unit 406 for checking account details and recording any charges associated with the requested connection. The authorization unit may also make use of a security unit 407 for checking that previous call records associated with client A do not indicate any spamming activity. If all checks are acceptable, the authorization unit may instruct the generation unit 408 to generate the required ticket(s) so that they can be transmitted to client A.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

What is claimed is:

1. A method for issuing tickets in a communication system comprising a plurality of nodes that are capable of establishing a communication connection between two or more clients, the method comprising:

receiving, at a ticket-issuing service from a first client, a request for a ticket authorizing the first client to establish a communication connection with a second client;

determining if the first client is authorized to establish the requested communication connection; and if the first client is determined to be authorized to establish the requested communication connection, transmitting to the first client one or more tickets designating the second client which authorize the first client to establish the requested connection with the second client by means of one or more of the plurality of nodes, the one or more tickets further authorizing the first client to communicate with the second client via at least one relay node allocated to the second client, the one or more tickets including an identifier of the at least one relay node or being encrypted with a private key of the at least one relay node to inform the at least one relay node that the first client is authorized to communicate with the second client via the at least one relay node.

2. The method as claimed in claim 1, wherein the request for the ticket includes a user identity corresponding to the second client, and wherein the method further includes determining the identities of one or more client terminals associated with the user identity.

3. The method as claimed in claim 2, the method further comprising transmitting to the first client a ticket that designates each of the one or more client terminals associated with the user identity.

4. The method as claimed in claim 2, the method further comprising transmitting to the first client a plurality of tickets, each of said plurality of tickets designating a respective one of the one or more client terminals associated with the user identity.

5. The method as claimed in claim 1, wherein the communication system is arranged such that each client operating in the system is allocated one or more nodes by means of which the client may establish a communication connection, the method further comprising determining the identity of the one or more nodes allocated to the second client associated with a user identity.

6. The method as claimed in claim 5, the method further comprising transmitting to the first client a ticket which authorizes the first client to establish the requested connection with the second client using any of the nodes allocated to the second client associated with the user identity.

7. The method as claimed in claim 5, the method further comprising transmitting to the first client a ticket which authorizes the first client to establish the requested connection with the second client using a subset of the nodes allocated to the second client associated with the user identity.

8. The method as claimed in claim 1, wherein the communication system is arranged such that each client operating in the system is allocated one or more nodes by means of which each client may establish a communication connection, the method further comprising receiving, at the ticket issuing service from the first client, an additional request for an additional ticket authorizing it to establish a communication connection by means of one or more of the nodes allocated to a client terminal associated with the first client.

9. The method as claimed in claim 1, wherein the request includes at least one of a user identity or a password associated with the first client, and wherein the method further comprises determining if the first client is authorized to establish the requested communication connection based on at least one of the user identity or the password.

10. The method as claimed in claim 1, the method further comprising determining if the first client is authorized to establish the requested communication connection based on whether the first client is permitted to establish a communication connection with the second client.

11. The method as claimed in claim 1, the method further comprising determining if the first client is authorized to establish the requested communication connection based on whether the second client is permitted to establish a communication connection with the first client.

12. The method as claimed in claim 1, the method further comprising checking a prepaid balance associated with the first client and determining that the first client is authorized to establish the requested communication connection based on the prepaid balance.

13. The method as claimed in claim 12, the method further comprising decrementing the pre-paid balance by an amount associated with the requested communication connection before transmitting the ticket to the first client.

14. The method as claimed in claim 1, the method further comprising determining if the first client is authorized to establish the requested communication connection based on previous communication connections established by the first client.

15. The method as claimed in claim 1, the method further comprising generating the ticket.

16. The method as claimed in claim 15, the method further comprising generating the ticket in such a way that the ticket can be read by any of the plurality of nodes.

17. The method as claimed in claim 15, the method further comprising generating the ticket in such a way that the ticket can only be read by one of the one or more of the plurality of nodes that the ticket authorizes the first client to use to establish the requested communication connection.

18. The method as claimed in claim 17, the method further comprising encrypting the ticket using a private key associated with the one or more nodes to enable the ticket to authorize the first client to use the ticket to establish the requested communication connection.

19. A node for issuing tickets in a communication system comprising a plurality of nodes that are capable of establishing a communication connection between two or more clients, the node including at least a memory and a processor to implement a ticket issuing service, the ticket issuing service configured to:
receive a request from a first client for a ticket authorizing the first client to establish a communication connection with a second client;
determine if the first client is authorized to establish the requested communication connection; and
if the first client is determined to be authorized to establish the requested communication connection, transmit to the first client one or more tickets designating the second client which authorize the first client to establish the requested connection with the second client by means of one or more of the plurality of nodes, the one or more tickets further authorizing the first client to communicate with the second client via at least one relay node allocated to the second client, the one or more tickets including an identifier of the at least one relay node or being encrypted with a private key of the at least one relay node to inform the at least one relay node that the first client is authorized to communicate with the second client via the at least one relay node.

20. A node as claimed in claim 19, wherein the ticket issuing service is further configured to identify a user identity corresponding to the second client in the request for the ticket, and to determine the identity of a plurality of client terminals in the communication system that are associated with the user identity.

21. A node as claimed in claim 20, wherein the ticket issuing service is further configured to transmit to the first client an additional ticket that designates all of the plurality of client terminals associated with the user identity.

22. A node as claimed in claim 20, wherein the ticket issuing service is further configured to transmit to the first client a plurality of tickets, each of said plurality of tickets designating a respective one of the plurality of client terminals associated with the user identity.

23. A node as claimed in claim 19, wherein the communication system is arranged such that each client operating in the system is allocated one or more nodes by means of which each client may establish a communication connection, the ticket issuing service further configured to determine an identity of the one or more nodes allocated to the second client associated with a user identity.

24. A node as claimed in claim 23, wherein the ticket issuing service is further configured to transmit to the first client an additional ticket which authorizes the first client to establish the requested connection with the second client using any of the nodes associated with the user identity.

25. A node as claimed in claim 23, wherein the ticket issuing service is further configured to transmit to the first client an additional ticket which authorizes the first client to establish the requested connection with the second client a subset of the nodes associated with the user identity.

26. A node as claimed in claim 19, wherein the ticket issuing service is further configured to determine from at least one of a user identity or a password included with the request for the ticket that the first client is authorized to establish the requested communication connection.

27. A node as claimed in claim 19, wherein the ticket issuing service is further configured to determine if the first client is authorized to establish the requested communication connection based on whether the first client is permitted to establish a communication connection with the second client.

28. A node as claimed in claim 19, wherein the ticket issuing service is further configured to determine if the first client is authorized to establish the requested communication connection based on whether the second client is permitted to establish the communication connection with the first client.

29. A node as claimed in claim 19, wherein the ticket issuing service is further configured to check a prepaid balance associated with the first client and to determine that the first client is authorized to establish the requested communication connection based on the prepaid balance.

30. A node as claimed in claim 29, wherein the ticket issuing service is further configured to decrement the prepaid balance by an amount associated with the requested communication connection before transmitting the ticket to the first client.

31. A node as claimed in claim 19, wherein the ticket issuing service is further configured to determine if the first client is authorized to establish the requested communication connection based on previous communication connections established by the first client.

32. A node as claimed in claim 19, wherein the ticket issuing service is further configured to generate the ticket.

33. A node as claimed in claim 32, wherein the ticket issuing service is further configured to generate the ticket in such a way that the ticket can be read by any of the plurality of nodes.

34. A node as claimed in claim 32, wherein the ticket issuing service is further configured to generate the ticket in such a way that the ticket can only be read by one of the one or more of the plurality of nodes that the ticket authorizes the first client to use to establish the requested communication connection.

35. A node as claimed in claim 34, wherein the ticket issuing service is further configured to encrypt the ticket using a private key associated with the one or more nodes that the ticket authorizes the first client to use to establish the requested communication connection.

36. A computer-readable storage device comprising instructions stored thereon that, when executed by one or more processors at a node, perform operations comprising:
   receiving a request from a first client for a ticket authorizing the first client to establish a communication connection with a second client;
   determining if the first client is authorized to establish the requested communication connection; and
   if the first client is determined to be authorized to establish the requested communication connection, transmitting to the first client one or more tickets designating the second client which authorize the first client to establish the requested connection with the second client by means of one or more of the plurality of nodes, the one or more tickets further authorizing the first client to communicate with the second client via at least one relay node allocated to the second client, the one or more tickets including an identifier of the at least one relay node or being encrypted with a private key of the at least one relay node to inform the at least one relay node that the first client is authorized to communicate with the second client via the at least one relay node.

* * * * *